United States Patent [19]
Marino

[11] Patent Number: 5,366,341
[45] Date of Patent: Nov. 22, 1994

[54] HELICAL HYDRAULIC PUMP

[76] Inventor: Giovani Marino, 6070 Lanquedoc, Montreal PQ, Canada, H1M 3C9

[21] Appl. No.: 57,401

[22] Filed: May 6, 1993

Related U.S. Application Data

[63] Continuation of Ser. No. 886,870, May 22, 1992, abandoned, which is a continuation-in-part of Ser. No. 749,333, Aug. 23, 1991, abandoned.

[30] Foreign Application Priority Data

Aug. 24, 1990 [GB] United Kingdom ............... 9018585

[51] Int. Cl.$^5$ ............................................. F03B 13/14
[52] U.S. Cl. ........................................ 415/6; 415/3.1; 415/75; 60/507
[58] Field of Search ............... 415/2.1, 3.1, 6, 72, 415/73, 75; 60/507

[56] References Cited

U.S. PATENT DOCUMENTS

| | | | |
|---|---|---|---|
| 997,663 | 7/1911 | Ford | 60/507 |
| 2,009,939 | 7/1935 | Massey | 60/507 |
| 4,228,658 | 10/1980 | Belcher | 415/75 |
| 4,408,455 | 10/1983 | Montgomery | 60/507 |
| 4,541,242 | 9/1985 | Thompson, Jr. | 60/507 |
| 5,073,082 | 12/1991 | Radilk | 415/6 |

FOREIGN PATENT DOCUMENTS

| | | | |
|---|---|---|---|
| 12 | 1/1873 | Italy | 415/6 |
| 325678 | 4/1935 | Italy | 415/6 |

Primary Examiner—Edward K. Look
Assistant Examiner—Michael S. Lee
Attorney, Agent, or Firm—Larson and Taylor

[57] ABSTRACT

A rotary pump capable of slow movement, for wave power applications. The pump is a helix formed of tubing whereby when the helix is rotated, the inlet end of the tubing scoops water and an outlet end of the tubing directed along the central longitudinal axis of the helix delivers liquid to a conduit means. The helix of tubing is preferably mounted on a shaft which is turned by ratchet device powered by rocking motion or rise and fall of water due to wave motion.

1 Claim, 3 Drawing Sheets

HELICAL HYDRAULIC PUMP

This application is a continuation of application Ser. No. 07/886,870 filed May 22, 1992, now abandoned; which is a continuation-in-part of 07/749,333 filed Aug. 23, 1991, now abandoned.

This invention relates to an apparatus for using water wave motion and particularly to a wave powered pump.

Power generators of various types have been proposed to convert movement of waves or tides into rotary motion which is used to turn a generator. For example, a tide operated generator is shown in U.S. Pat. No. 4,541,242 and a ratchet type wave motor is disclosed in U.S. Pat. No. 2,009,939. However those devices do not provide a simple inexpensive safe dependable pump for use in such applications as pumping bilges of boats left for extended periods of time at moorings. Known electrical pumps used for this purpose have a tendency to burn out if allowed to run dry if controls are not provided, or if any provided controls fail to operate properly. Other problems include failure of power supply, shorting out of immersed pumps and inability to pump when a reservoir or sump is very shallow.

The pump of this invention is not limited to pumping bilges however: many other uses may be found for a slow moving reliable pump which is self priming, and requires no one way valves. A larger version of the pump of this invention is suitable for such applications as irrigation. It will be appreciated that a continuous supply of water from a dependable wave powered pump could replace an intermittent high flow rate gasoline engine pump or a pump driven by an electric motor. Furthermore, the pump of this invention is not limited to pumping water, and can be used for any low viscosity liquid.

It is therefore an object of the present invention to provide a pump capable of being powered by water motion, wave motion or other slow or intermittent power sources.

Another object of the present invention is the provision of a pump which will move fluids through a conduit without the use of valves.

Another object is the provision of a pump which is capable of being self priming.

A still further object is the provision of a pump which has few moving parts and is therefore simple and inexpensive to construct, easy to maintain, and reliable in operation.

Accordingly the present invention provides

A fluid pump adapted to be rotated by wave or water power through the use of ratchet means, said fluid pump comprising:
a conduit in the form of a helix support means for said helix rotationally supporting said helix for rotary motion about its longitudinal axis, an inlet means at a first end of said helix for scooping fluid, and an outlet means at a second end of said helix aligned with said shaft; and The invention further provides
a fluid pump wherein said helix is formed of tubing and said outlet means comprises a rotary seal between an end of said helix and outlet conduit means; and wherein said inlet is an open-ended semi-circular coil of said helix.

In the accompanying drawings which illustrate preferred embodiments of this invention:

Figure 1:
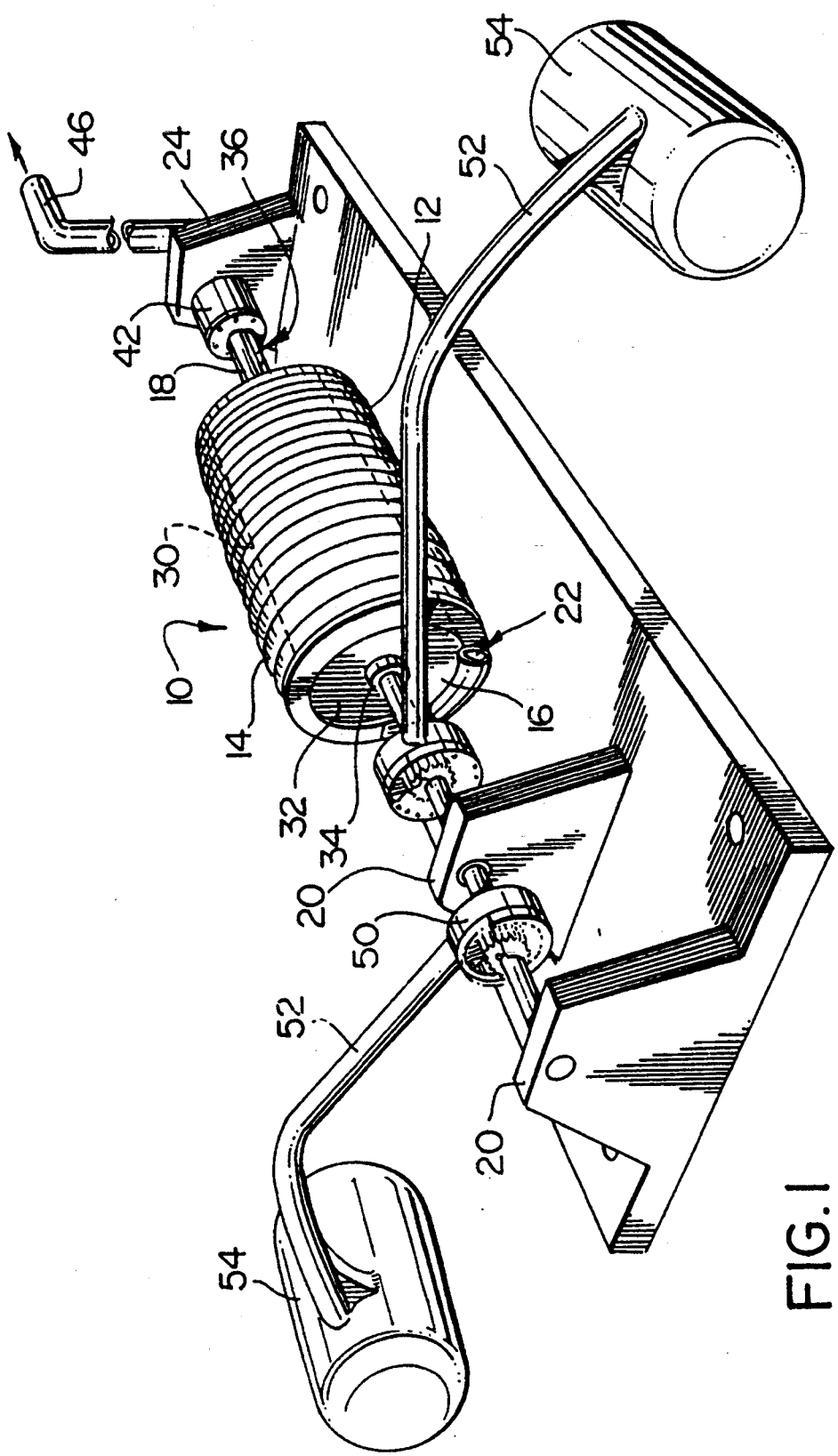
FIG. 1 is a perspective view of a pump in accordance with this invention.
Figure 2:
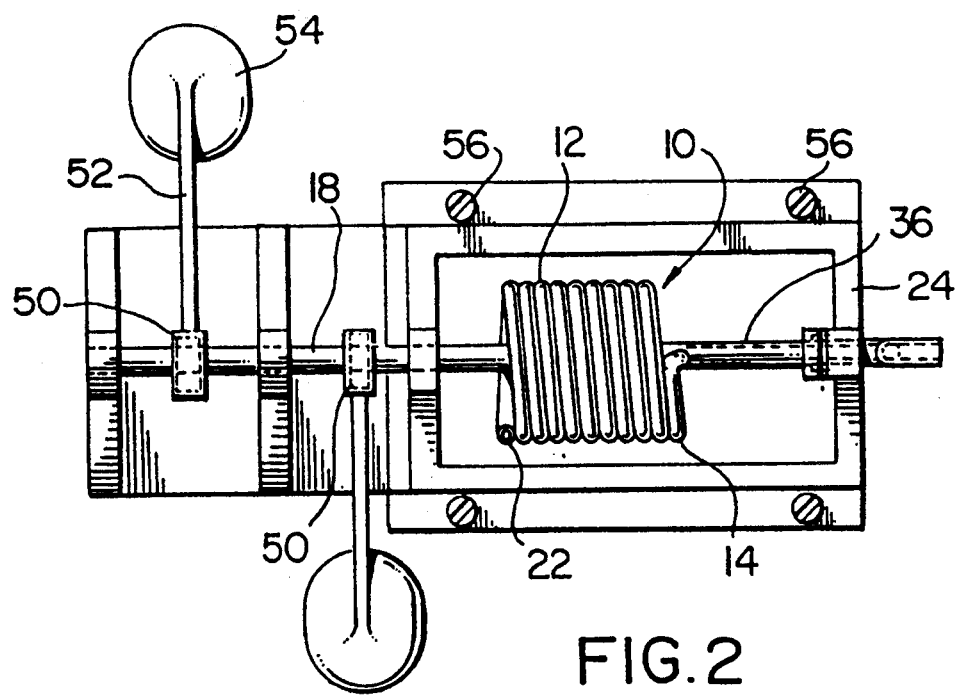
FIG. 2 is a top plan view of the pump of FIG. 1 mounted in a housing.
Figure 3:
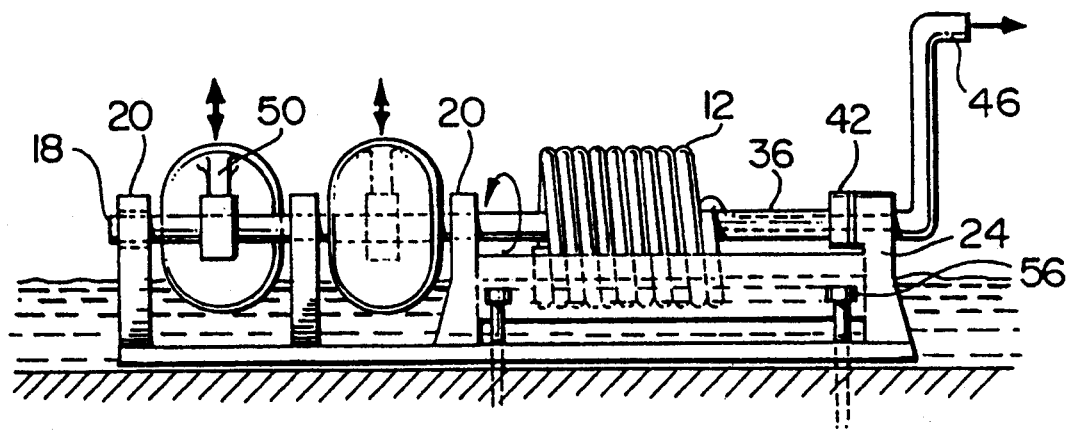
FIG. 3 is a side elevational view of the pump of FIG. 1 immersed in liquid.

Referring now in detail to the drawings, the pump shown generally at 10 in FIG. 1 has a helix 12 constructed of tubing 14 on support means, or spacers 16 for mounting the helix 12 on a suitable shaft 18 extending through the longitudinal central axis of the helix 12. The helix is mounted for rotation on suitable supports 20 as shown in FIG. 1 or in a housing 24 as shown in FIG. 2.

In one form this tubing 14 is wrapped on a mandrel 30 indicated by broken lines in FIG. 1. In this embodiment spacers 16 are in the form of end caps 32 (one of which is shown in FIG. 1) having central hubs 34 through which the shaft 18 extends.

Figure 4:
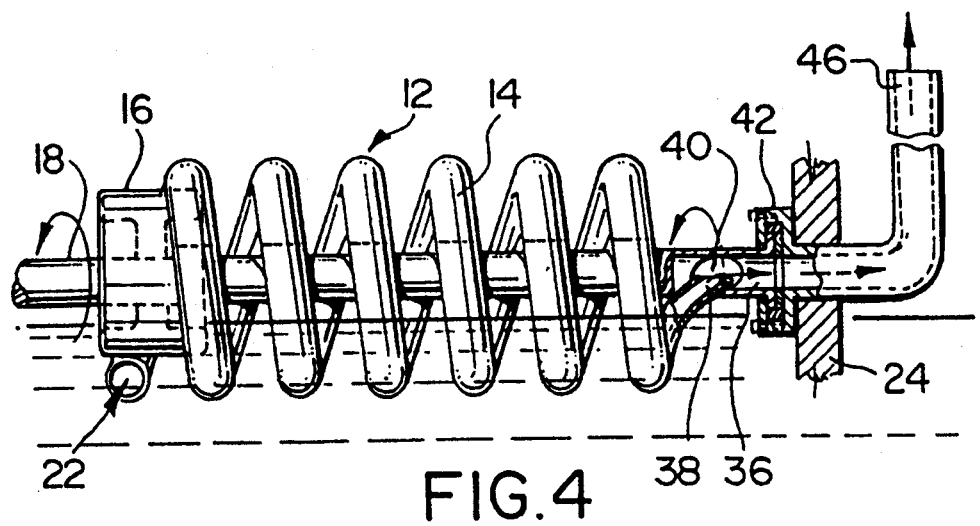
FIG. 4 is a part sectional enlarged view of the inlet and outlet means of the pump.

As shown in FIG. 4 at least an end portion 36 of the shaft 18 is hollow so that an outlet end 38 of the helix 14 can be in communication with the shaft 18 as through a suitable aperture 40 in the shaft 18. The end portion 36 of the shaft 18 is received in a conventional rotating shaft seal 42 having an o-ring or packing bearing on the shaft to provide substantially fluid-tight connection between the hollow rotating shaft 18 and an outlet conduit 46.

Figure 5:
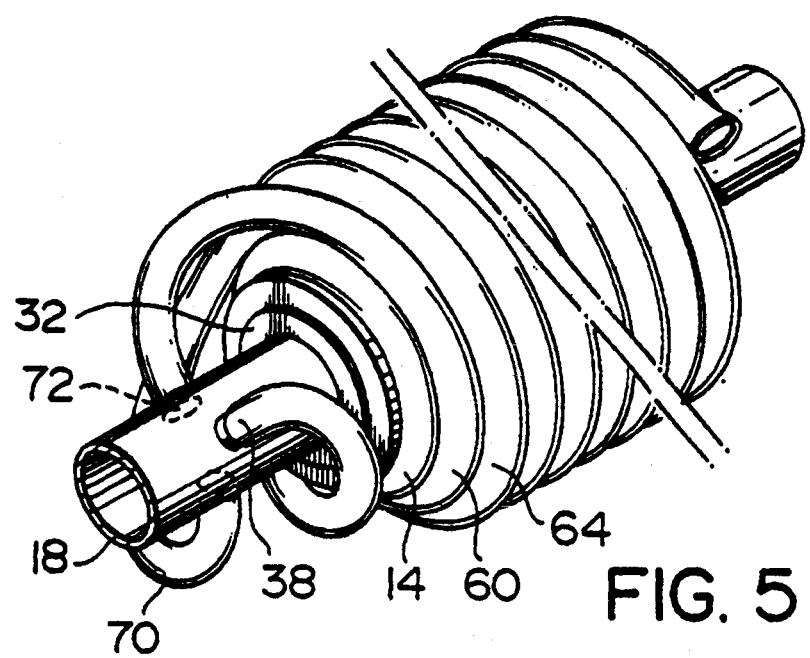
FIG. 5 is a perspective view of an alternative pump.
Figure 6:
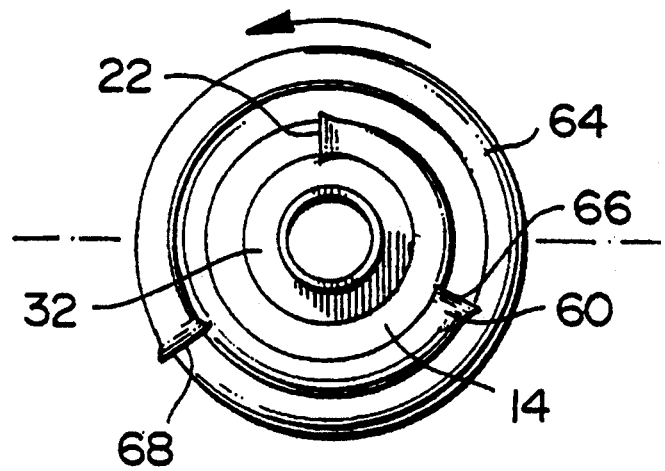
FIG. 6 is an end view of the pump of FIG. 5.

Alternatively, as shown in FIGS. 5 and 6, one or more additional tubular helixes 60 and 64 are superimposed on the helix 14. It will be noted that inlets 66 and 68 respectively of the additional tubular helixes 60 and 64 are spaced radially about the periphery of the pump 10 and are preferably flared at their outer ends. The additional helixes 60 and 64 have their outlet ends 70 and 72 respectively connected to the hollow shaft 18 in the same manner as the outlet 38 of the helix 14 described above.

Rotating motion of the pump 10 is provided by at least one ratchet mechanism 50 secured to the shaft 18. The ratchet means 50 has an arm 52 and a float 54 at the end of the arm 52. Movement of the arm 52 causes rotary motion of the shaft 18, in this case counterclockwise motion as viewed in FIG. 1 and as indicated by the arrows in FIG. 4.

It may not be essential to provide a rotating joint between the tubing and an outlet conduit for some applications particularly where flexible tubing is used for the outlet or the entire helix. The flexible tubing will rotate and can be guided within a conduit or the like, not shown, similar to conduit 46. For applications such as irrigation the outlet end would then rotate within the guide and deliver liquid at the end of the guide.

In operation the pump is mounted in an environment where there is relative motion between the arms 52 and the shaft 18. This motion is transmitted through the ratchet(s) 50, and causes the shaft to rotate. Liquid will be scooped by the inlet portion 22 of the helix 12. Further motion, in this case counter clockwise motion as viewed in FIG. 4 causes the fluid to move through the tubing helix 14. It will be noted that the pump 10 is partially submerged so that air also enters. As the helix 12 continues to rotate liquid moves from the inlet end of the helix to the outlet end and will travel up the conduit 46.

In order to maintain the pump 10 in a partially submerged position the support 20 or housing may be allowed to float while being tethered, so that relative motion of the ratchet means 50 will turn the shaft 18 without rocking or raising the support 20 or 24. One such means for adjustably mounting the pump is retaining screws 56 which allow vertical movement of the support 20.

Alternatively, the outlet 46 can be slidably located in a suitable housing, not shown, thus also permitting vertical movement as the liquid level changes.

Although the embodiment of the pump 10 described above is particularly suited to wave motion type drive means, it will be understood that the ratchet means could be adapted to tidal power and thus the ratchet means would provide the required rotary motion of the pump as the tide rises and falls. Pumping sea water to evaporation beds could be carried out in this manner. Furthermore, the pump of this invention can be driven by electrical means such a solenoid to provide a slow or measured intermittent supply of a liquid or slurry.

The pump 10 shown in FIGS. 5 and 6 provides an improved flow rate with no increase in the sale of rotation when required. It is possible therefore, to increase the flow rate without adding pumps or increasing the size of pumps required particularly where space is limited.

Various changes in the dimensions to accommodate a variety of applications will occur to those skilled in the art. Such variations are believed to be within the scope of the present invention. For example, a small bilge pump having a helix formed of 15 turns of ¼ inch tubing on a 1¾ diameter core will raise water about 18 inches. A larger model of the pump constructed of 7 turns of 1¼ inch tubing coiled to provide a helix 11 inches in diameter raises water over 5 feet in the outlet conduit.

I claim:

1. A fluid pump capable of raising fluid comprising:

a conduit in the form of a helix of tubing to provide a closed path;

support means including a shaft for rotationally supporting said helix for rotary motion about its longitudinal axis;

means to prevent said pump from being totally submerged;

one or more additional helix, superimposed on said helix;

an inlet means defined by an open end of semi-circular coil on one end of said helix for scooping fluid on rotation of the helix;

each helix having an inlet spaced radially about the shaft;

an outlet means on the other end of the said helix, aligned with said shaft;

a rotary coupling and seal on said shaft; and ratchet means on said shaft for rotating said shaft intermittently in one direction only whereby on being driven by said ratchet means fluid entering said inlet means moves through said helix to said outlet and to a second conduit which extends above a level of the fluid to be pumped.

* * * * *